L. C. PARIS & T. MILLWARD.
MACHINE FOR CARBONATING BEVERAGES.
APPLICATION FILED MAR. 23, 1910.
1,038,191.
Patented Sept. 10, 1912.
6 SHEETS—SHEET 6.
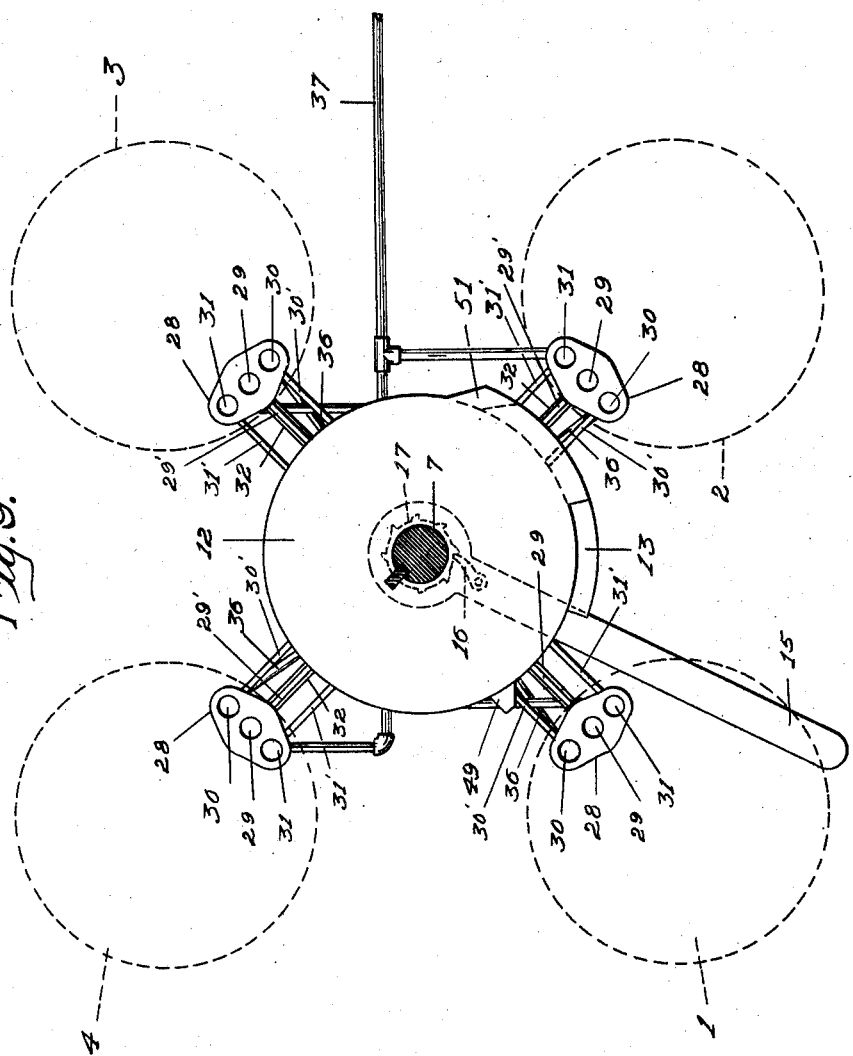
WITNESSES:
Frank Simney
A H. Kephart
INVENTOR
LEON C. PARIS
THOMAS MILLWARD
BY
Carlos P. Griffin
ATTORNEY

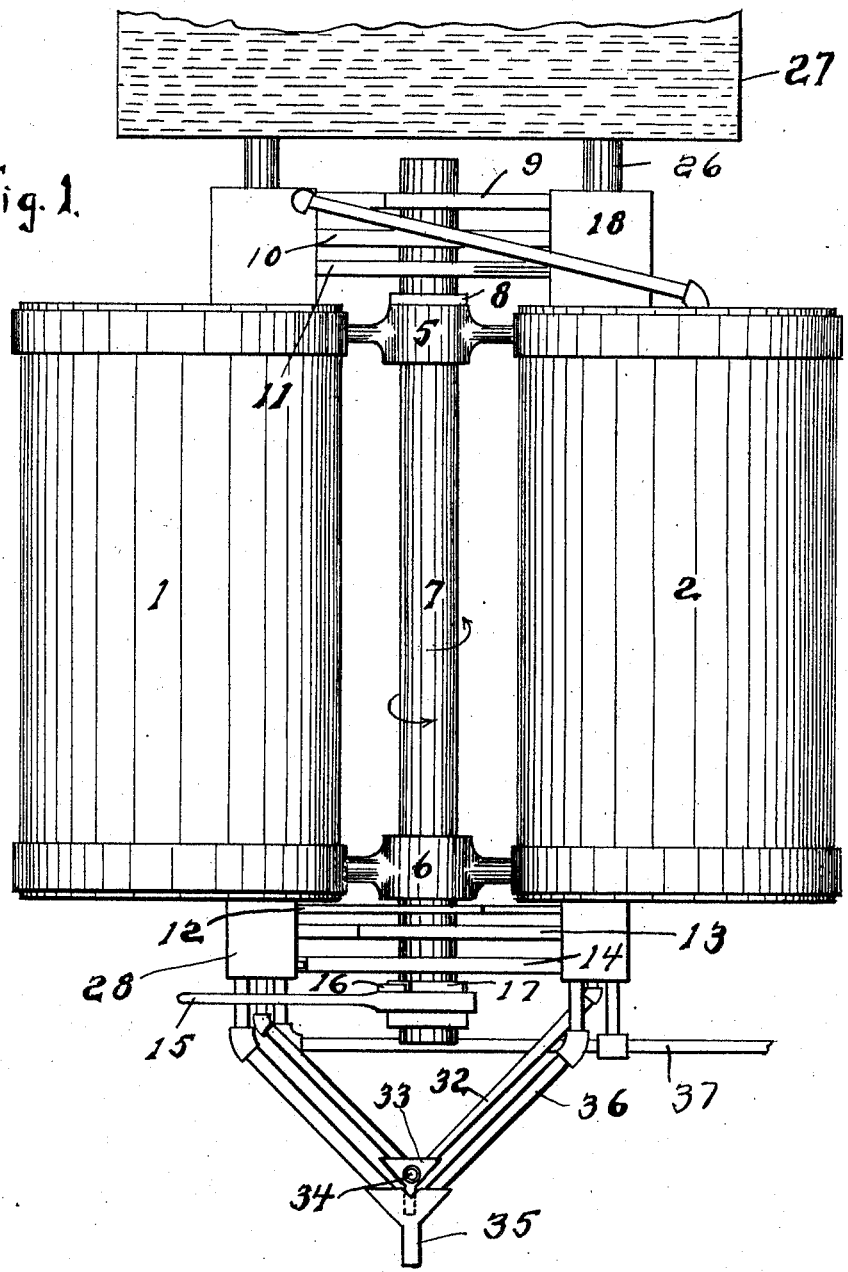

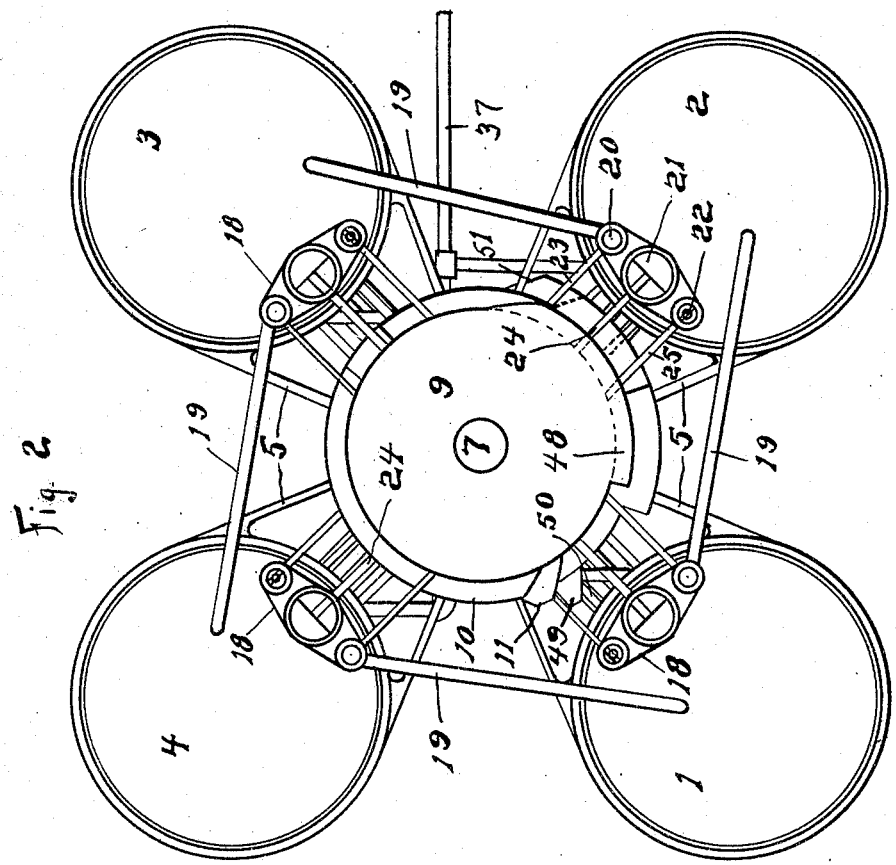

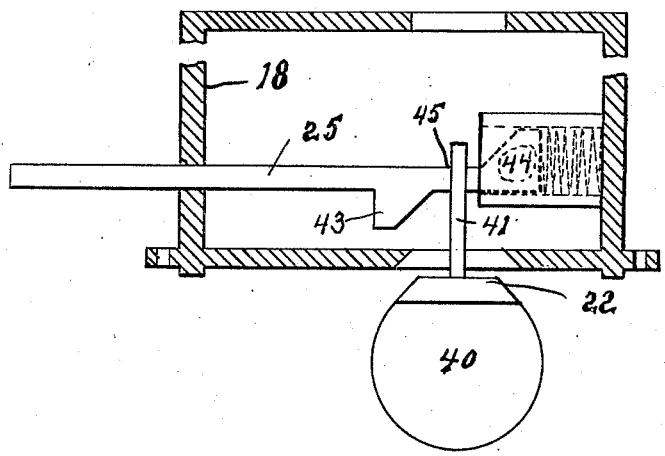
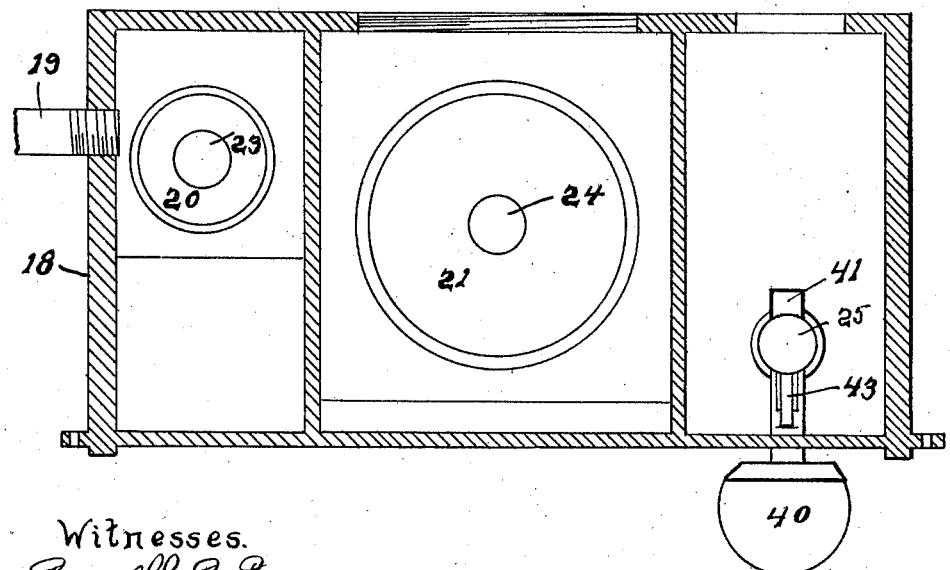

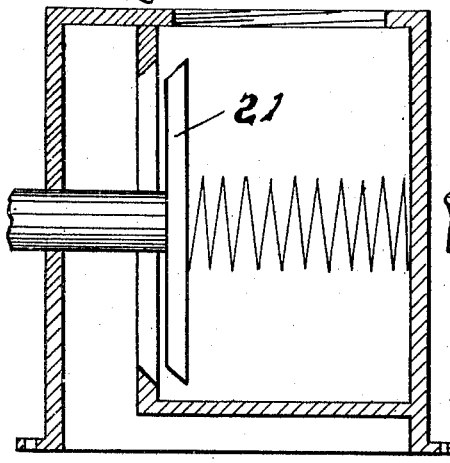
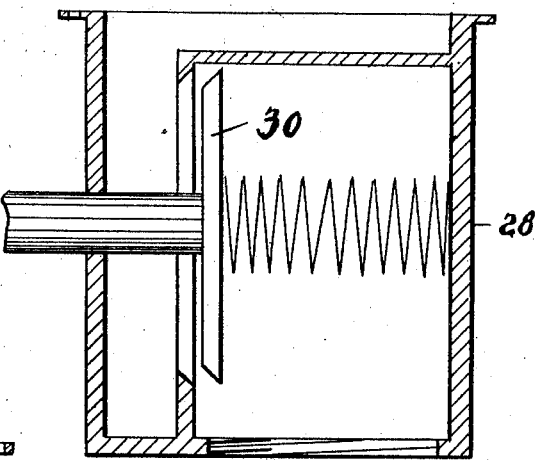
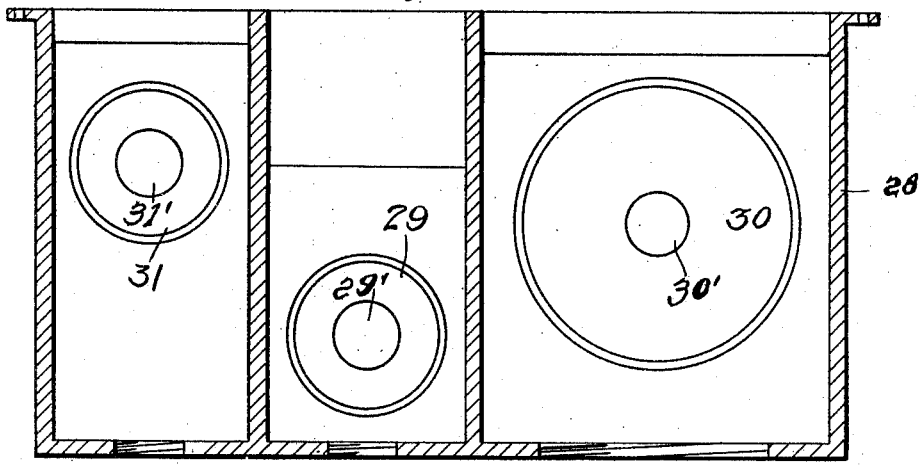

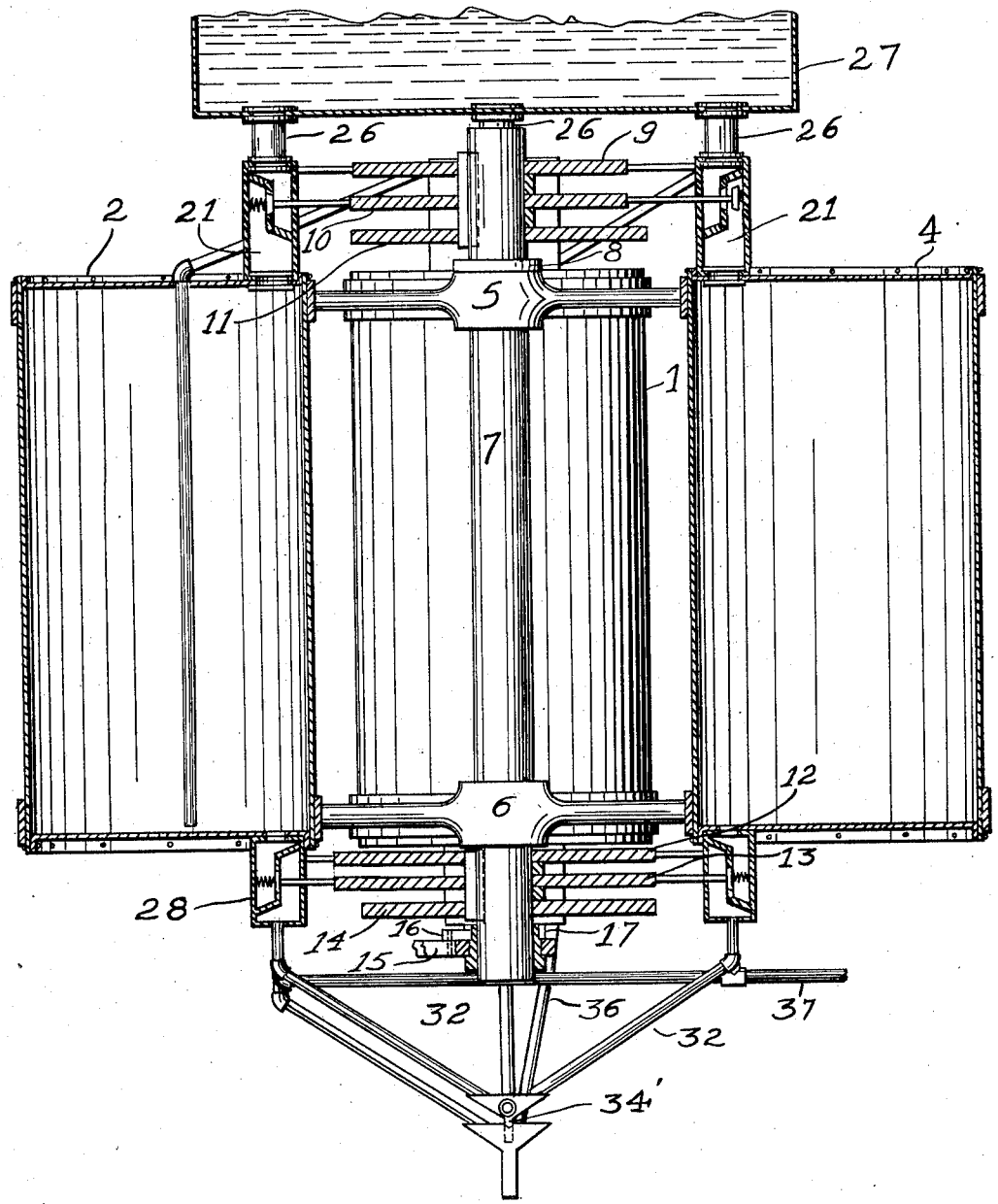

UNITED STATES PATENT OFFICE.

LEON C. PARIS AND THOMAS MILLWARD, OF SAN FRANCISCO, CALIFORNIA, ASSIGNORS OF ONE-THIRD TO J. R. HOWELL, OF SAN FRANCISCO, CALIFORNIA.

MACHINE FOR CARBONATING BEVERAGES.

1,038,191.      Specification of Letters Patent.      Patented Sept. 10, 1912.

Application filed March 23, 1910. Serial No. 551,133.

*To all whom it may concern:*

Be it known that we, LEON C. PARIS and THOMAS MILLWARD, being citizens of the United States, residing at San Francisco, in the county of San Francisco and State of California, have invented a new and useful Machine for Carbonating Beverages, of which the following is a specification in such full and clear terms as will enable those skilled in the art to construct and use the same.

This invention relates to an apparatus for carbonating beverages, and its object is to carbonate a quantity of the beverage as it is used and without any further power than is obtained from the tank of carbon dioxid from which the gas is drawn.

A further object of the invention is to produce a machine which carbonates the beverage independent of the pressure of the water supply thereto.

It will be understood by those skilled in the art that many machines have been constructed for carbonating water or liquids directly from the pressure pipes supplying them to the carbonating machine. Such machines will operate very well when the water pressure is above 50 pounds, but experimental work has shown that they do not work satisfactorily at pressures below 50 pounds. The object of this machine is to make a means which will do said work entirely independent of any desirable water pressure, the only requirement being that the water be supplied thereto at such a level as to run into the containers by gravity.

In the drawings in which the same numeral of reference is applied to the same portion throughout the several views, Figure 1 is a front elevation of the complete machine, showing a water supply tank partially cut away. Fig. 2 is a plan view of the same machine with the water tank omitted therefrom. Fig. 3 is a vertical sectional view through the air pressure outlet valve, showing the float carried by said valve. Fig. 4 is a vertical sectional view through the circulation valve, the water inlet valve and the air pressure relief valve. Fig. 5 is a sectional view through the water valve. Fig. 6 is a sectional view of the water outlet valve, the gas inlet valve and the high pressure water outlet valve. Fig. 7 is a transverse vertical sectional view through the water outlet valve. Fig. 8 is a vertical sectional view through two of the containers, showing one water supply valve open, and Fig. 9 is a plan view showing the arrangement of the lower cams and valves, the containers being indicated by dotted lines.

The numerals 1, 2, 3 and 4 are applied to the liquid containers, of which there may be any desired number according to the desired capacity of the machine. In the present instance, four containers have been shown to accomplish the carbonation of the beverage, but whatever the number of containers, the method of operation is practically the same. The four containers are secured together by means of a spider 5 at the top thereof and a second spider 6 at the bottom thereof. These spiders support the vertical shaft 7 which is maintained in a given position with respect to the spiders by means of a collar 8. This shaft is provided at the top with cams 9, 10 and 11 and at the bottom with cams 12, 13 and 14, said cams each operating valves on the several containers. Below the cam 14, this shaft is provided with a handle 15, said handle being freely movable on said shaft, save that a pawl 16 catches in the detents in a collar 17 carried by said shaft, the object being to provide means whereby the shaft may be rotated to the right as indicated by the arrow on Fig. 1.

Each container is provided with a valve casing 18 at the top thereof. In each casing there are three valves, as will be later explained, and each casing is connected with the adjacent container by means of a circulation pipe 19, said circulation pipe extending into the bottom of the container adjacent the casing 18, from which it starts.

The valve casing 18 is provided with a circulation valve 20, a water valve 21 and a pressure relief valve 22, said valves having stems 23, 24 and 25 respectively for the purpose of opening and closing them. Each of the water valves is connected by means of a short vertical pipe 26 to the water tank 27, although, of course, it will be understood that a water supply pipe under pressure might equally well be substituted for the tank 27 if so desired. At the bottom each container is provided with a valve casing 28, in which there are three valves 29, 30 and 31, the valve 29 being for the purpose of delivering a stream of carbonated water or liquid under considerable pressure to the pipe line 32, said pipe line leading into a casting 33 having a valve at 34 therein. The casting 33 has a fine pipe 34' extending into the water outlet pipe 35, the object being to deliver a very fine stream of carbonated beverage or liquid under high pressure into the vessel into which the liquid is being drawn. Each casing 28 also contains a water outlet valve 30, which is connected with the pipe 36 leading to the outlet 35, and in the opposite end of the casing from the valve 30 is a small gas pressure valve 31, said valve being connected with the gas inlet main 37. Each of the valves 29, 30 and 31 is provided with an operating stem as shown at 29', 30' and 31', extending radially toward the center of the shaft 7, as shown in Fig. 2, said valves being operated by the cams on said shaft 7 below the containers. It will be understood by those skilled in the art that each valve is adapted to be closed by means of a spring contained in said valve casing when not unseated by means of the respective cams. The air pressure outlet valve 22 is operated in a different manner from the other valves. Means must be provided to close the valve 22 when the container has been filled to a certain level, regardless of whether the cams are rotated or not, and this valve must be forcibly opened when the container is under pressure. The valve 22 is provided with a float and with a slotted stem 41, said slotted stem being operated by cams 43 and 44 on the stem 25 of the pressure relief valve, said cams being placed apart a short distance, as illustrated at 45 in order that the pressure relief valve may be permitted to seat when the valve stem is in the neutral position.

The operation of the machine is as follows: Supposing each of the containers to be empty, the tank 27 filled with water and the pipe 37 connected with a supply of carbon dioxid at a suitable pressure for the purpose of carbonating, usually from 50 to 75 pounds. Attention being paid to Fig. 2, it will be seen that the stem 23 on the container 2 has been pushed outwardly by the cam 48, while the stem 25 on the container 1 and the stem 24 on container 4 are pushed outwardly by the cams 10 and 11 respectively. At this instant all the other valves on the top of the containers are closed. This permits gas to flow from the container 2 into the container 3 and permits water to flow into container 4 while the air is escaping therefrom and reduces the pressure in container 1 so the liquid may be quietly drawn therefrom. If the handle is left in this position for any length of time the float valve on the container 4 will close as soon as the water fills it full enough. Now observing Fig. 9, which shows the lower valves and their operating cams in the proper relative position to the upper cams at the same instant, it will be seen that the stem 31' and the stem 29' on the container 2 have been pushed outwardly by their respective cams, while the stem 30' on container 1 is just ready to open the valve 30 as shown at 50 by riding up on the cam 49, therefore, all the valves at the bottom of the containers save the two valves 29 and 31 on the container 2 are closed at this instant. It will be observed that the cam 11 has a high place, shown in Fig. 2, whereby the stem 25 is pushed abnormally more than any of the series at the top of the containers, the object of this being to unseat the float valve and then retracting the stem to the neutral position as indicated in Fig. 3, said valve stem then continuing in contact with a portion of the cam 11, at the same distance from the center as the outside of the cam 10. It will be observed that the pressure is now removed from the tank 1 and that with a very short turn of the shaft 7, that water can be drawn from the tank. It is necessary to stop the rotation of the shaft 7 for such a time as it is desired to draw the water from the container 1, so that the short cam 49 can hold one of the stems 30' out. Since the high place of the cam 11 has pushed the stem 25 outwardly far enough to unseat the valve 22, the pressure will be removed from the containers 1 and 4 and at this time the cam 10 will open the water valve on the container 4, permitting it to fill with water until it is cut off, either by the movement of said cam or by the water rising to the level of the float 40. During this same time the gas pressure will be on the containers 2 and 3. After a sufficient quantity of the carbonated beverage has been drawn, it may be desired to stir the same up, in which event the water supply is cut off by moving the shaft to the right enough for the stem 30' as shown at 50 to slip off the high place 49 when the water outlet will be closed. The valve 34 may be opened when it is desired to send a fine stream of water down into the receptacle being filled. A stream of water under pressure may be drawn from the pipe line 32 at any time, since it will always be under pressure from one of the containers, due to the valve held open by the high place 51 on the cam 12. When the valve 34 has been closed additional water may be drawn from the machine or not, as may be desired. When it is desired to draw additional water from the machine, the handle 15 is turned to the next notch and is rotated to the right until the water begins to run from the pipe 35, at which time it will be held in that position until the desired quantity of water has been drawn from the machine.

It is to be noted that any given container is filled under whatever pressure the water may have in the pipe line leading thereto and the container is closed either by the filling of the container until the water contacts with the float 40, or should the water run in too slowly, the container will be closed positively by the action of the valve stem 25. The reason for this lies in the necessity of closing the container before the gas has access thereto to prevent water from being blown out of the relief valve.

Having thus described our invention what we claim as new and desire to secure by Letters Patent of the United States is as follows:

1. In a carbonating machine, a series of three or more connected containers, means to successively supply the containers with liquid, means to successively supply the containers next adjacent the containers being filled with liquid with carbon dioxid under pressure, means to successively draw liquid from the containers being filled with liquid, and means to reduce the pressure on the containers being filled and the container from which liquid is to be drawn prior to the operation of drawing said liquid, as described.

2. In a carbonating machine, a series of three or more connected containers, means to successively supply each of the containers with liquid, means to successively supply the containers ahead of the containers being filled with carbon dioxid under pressure, an exhaust valve on each container, means to successively draw liquid from the containers immediately behind the containers being filled, and means to open the exhaust valve on each container when liquid is to be drawn therefrom, as described.

3. In a carbonating machine, a series of three or more containers symmetrically arranged, a water supply valve, an exhaust valve and a circulation valve carried by each container, a pipe extending from each circulation valve into the bottom of the next adjacent container, a carbon dioxid supply valve and an outlet valve on the bottom of each container, a vertical shaft, cams carried by said shaft to operate the valves on the containers in succession so that while liquid is being drawn from one container, the container next adjacent the one side will be filling with a fresh supply of water and the container next adjacent the other side will be receiving a charge of carbon dioxid, as described.

4. In a carbonating machine, a series of three or more containers, a gas circulation pipe extending from the upper portion of each container to the lower part of the next adjacent container, a water supply valve, a circulation valve and an exhaust valve at the top of each container, a gas supply valve and a water discharge valve at the bottom of each container, a vertical shaft adjacent the containers, cams carried by said shaft adjacent the top and bottom of the containers and arranged to operate the several valves, so that one of the containers will be discharging liquid while the next adjacent container is being filled with liquid and while the container next adjacent the other side is receiving a charge of carbon dioxid under pressure, and a handle for rotating said shaft, as described.

5. In a carbonating machine, a series of three or more containers, a water supply valve, a pressure relief valve and a circulation valve carried by each container at the top thereof, a water discharge valve and a carbon dioxid supply valve at the bottom of each container, a revoluble shaft carrying cams to operate all of said valves so that while one container is discharging fluid the next adjacent container on one side will be receiving a charge of fluid and the container next adjacent on the other side will be receiving a charge of carbon dioxid under pressure, as described.

6. In a carbonating machine, a series of four connected containers, a water supply valve, a circulation valve, a relief valve, a discharge valve and a gas supply valve carried by each container, a revoluble shaft and cams on said shaft for the operation of all of said valves so that while one container is having liquid withdrawn therefrom the next adjacent container will be receiving a supply of water and the container next adjacent will be receiving a supply of carbon dioxid under pressure and which carbon dioxid is permitted to pass into the container next adjacent that one, as described.

In testimony whereof we have hereunto set our hands this 10th day of March, A. D. 1910, in the presence of the two subscribed witnesses.

LEON C. PARIS.
THOMAS MILLWARD.

Witnesses:
A. K. DAGGETT,
C. P. GRIFFIN.

---

Copies of this patent may be obtained for five cents each, by addressing the "Commissioner of Patents, Washington, D. C."